(12) United States Patent
Zotto et al.

(10) Patent No.: US 11,722,765 B2
(45) Date of Patent: Aug. 8, 2023

(54) KNOWLEDGE BASE IMAGE RECOMMENDATIONS

(71) Applicant: Hewlett-Packard Development Company, L.P., Spring, TX (US)

(72) Inventors: Rafael Dal Zotto, Porto Alegre (BR); Qian Lin, Palo Alto, CA (US)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 17/463,316

(22) Filed: Aug. 31, 2021

(65) Prior Publication Data
US 2023/0064801 A1 Mar. 2, 2023

(51) Int. Cl.
*H04N 23/60* (2023.01)
*G06N 20/00* (2019.01)
*G06N 5/02* (2023.01)
*H04N 23/611* (2023.01)

(52) U.S. Cl.
CPC ............. *H04N 23/64* (2023.01); *G06N 5/02* (2013.01); *G06N 20/00* (2019.01); *H04N 23/611* (2023.01)

(58) Field of Classification Search
CPC .. H04N 5/23222; H04N 5/23219; G06N 5/02; G06N 20/00
See application file for complete search history.

(56) References Cited

U.S. PATENT DOCUMENTS

2018/0109767 A1\* 4/2018 Li ..................... H04N 7/185
2018/0260417 A1\* 9/2018 Mahadevan ........ G06F 16/9537

\* cited by examiner

*Primary Examiner* — Yogesh K Aggarwal
(74) *Attorney, Agent, or Firm* — Quarles & Brady LLP

(57) ABSTRACT

In an example implementation according to aspects of the present disclosure, a device, method, and storage medium. The device comprises a processor and memory with instructions to receive a digital image and extract administrative and descriptive metadata. The device stores the administrative and descriptive metadata in a knowledge base and determines a digital image quality score. The device creates a recommendation based on the administrative and descriptive metadata and the digital image quality score.

14 Claims, 4 Drawing Sheets

KNOWLEDGE BASE IMAGE RECOMMENDATIONS

BACKGROUND

Digital imaging has become ubiquitous in modern society. With digital imaging devices integrated into mobile phones, the ability of any user to pick up and take a digital image of a scene, has become almost second nature.

DETAILED DESCRIPTION

With the proliferation of digital imaging devices integrated into mobile computing devices, consumer photography has become very accessible. Many users capture digital images and digital video every day. Some of those images may be stored for later viewing, but often many are deleted as there is a defect with the framing of the shot, or an issue with the subject. Likewise, the search for new and interesting subjects for digital imaging is never ending.

Described herein is a knowledge base image recommendation system. In one example, a processor receives a digital image. The administrative metadata such as exchangeable image file format (EXIF) data may be extracted from the digital image. Administrative metadata corresponds to data relevant to the creation of the digital image including, creation date and location, instructions for the users, job identifiers, and other details. Descriptive metadata may include information about the content of the digital image including faces, objects, brands, etc. and may be extracted via a machine learning algorithm. In one implementation, the descriptive metadata may be the result of the application of more than one machine learning algorithm on the same digital image, yielding different outputs. The descriptive metadata and the administrative metadata may be stored in a knowledge base. A digital image quality score for the digital image may be determined and based at least in part on the digital image quality score and traversing the knowledge base, the processor may create a recommendation.

Figure 1:
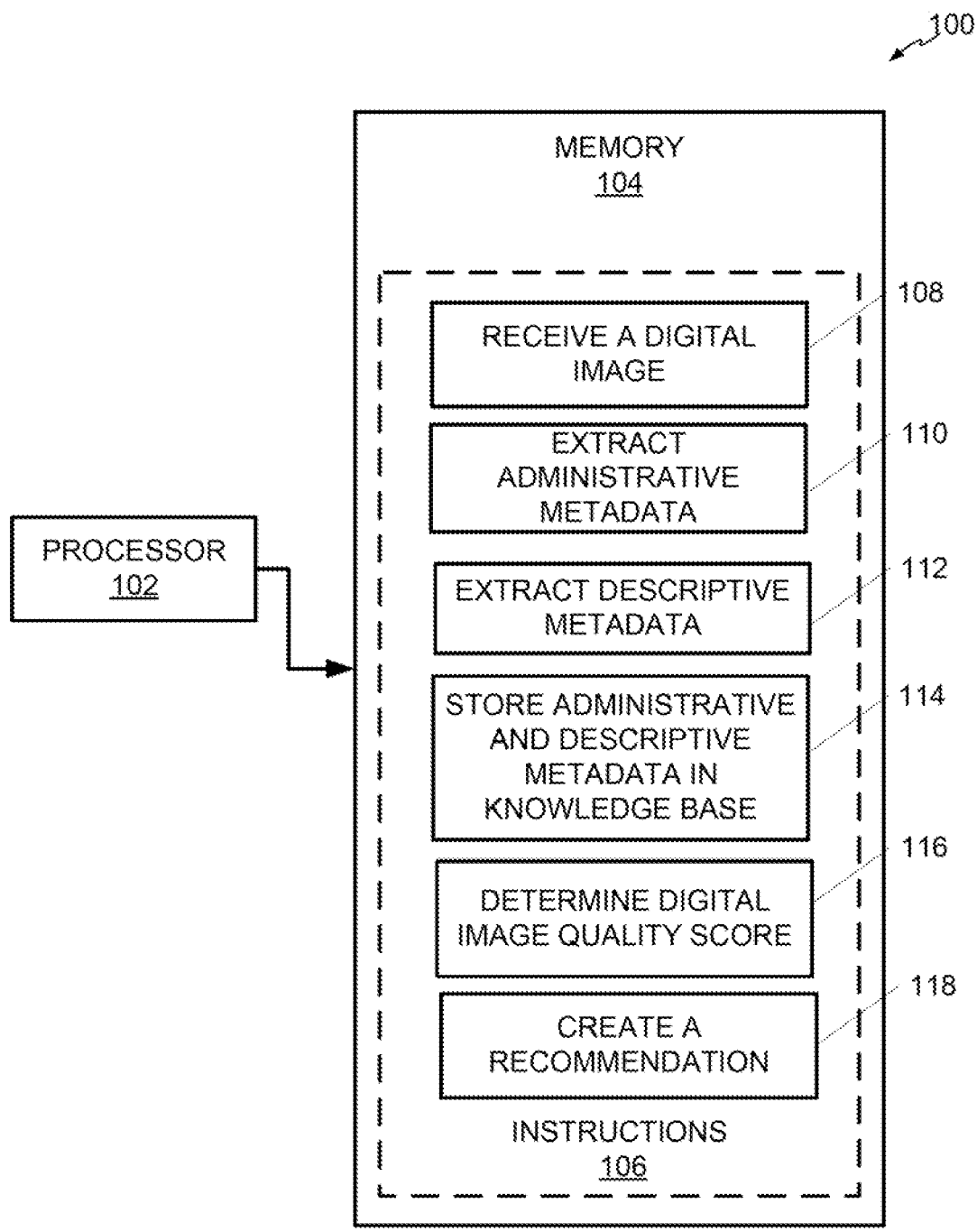
FIG. 1 is a block diagram of a device for supporting knowledge base image recommendations, according to an example.

FIG. 1 is a block diagram of a device for supporting knowledge base image recommendations, according to an example. The processor 102 of the device 100 may be implemented as dedicated hardware circuitry or a virtualized logical processor. The dedicated hardware circuitry may be implemented as a central processing unit (CPU). A dedicated hardware CPU may be implemented as a single to many-core general purpose processor. A dedicated hardware CPU may also be implemented as a multi-chip solution, where more than one CPU are linked through a bus and schedule processing tasks across the more than one CPU.

A virtualized logical processor may be implemented across a distributed computing environment. A virtualized logical processor may not have a dedicated piece of hardware supporting it. Instead, the virtualized logical processor may have a pool of resources supporting the task for which it was provisioned. In this implementation, the virtualized logical processor may be executed on hardware circuitry; however, the hardware circuitry is not dedicated. The hardware circuitry may be in a shared environment where utilization is time sliced. In some implementations the virtualized logical processor includes a software layer between any executing application and the hardware circuitry to handle any abstraction which also monitors and save the application state. Virtual machines (VMs) may be implementations of virtualized logical processors.

A memory 104 may be implemented in the device 100. The memory 104 may be dedicated hardware circuitry to host instructions for the processor 102 to execute. In another implementation, the memory 104 may be virtualized logical memory. Analogous to the processor 102, dedicated hardware circuitry may be implemented with dynamic random-access memory (DRAM) or other hardware implementations for storing processor instructions. Additionally, the virtualized logical memory may be implemented in a software abstraction which allows the instructions 106 to be executed on a virtualized logical processor, independent of any dedicated hardware implementation.

The device 100 may also include instructions 106. The instructions 106 may be implemented in a platform specific language that the processor 102 may decode and execute. The instructions 106 may be stored in the memory 104 during execution. The instructions 106 may include instructions to receive a digital image 108. A digital image may be received by the processor 102 from a communicatively coupled digital imaging component or digital camera. In one implementation, a digital camera may be integrated into the device. The digital camera may be a camera on the opposite side of the device from a display, where when active, a user may see on the screen a video stream of what lay on the other side of the display. In other implementations the digital camera may be a user facing camera common for creating "selfie" photographs of the user. The digital camera may be communicatively coupled to the processor 102 by a bus. The digital image may be one frame within a stream of images constituting a preview video stream displayed on the device 100 display.

The instructions 106 may include instructions to extract administrative metadata 110. One example of administrative metadata may include exchangeable image file format data or EXIF data. EXIF data is a standardized metadata structure usually embedded within the digital image file. The EXIF data often includes data corresponding to the camera functions of the image, including ISO level, aperture, flash, shutter speed, and so on. As EXIF data is standardized, common software libraries may be utilized to extract the data from the image file.

The instructions 106 may include instructions to extract descriptive metadata based on machine learning algorithm 112. The field of computer vision has many object detection and scene understanding algorithms. Convoluted Neural Networks may be trained and used for object detection. Likewise, scale-invariant feature transform may also be utilized. The scope of this disclosure is limited to the application of an object detection and scene understanding routine. Many software libraries already exist for face detection, object detection, and brand or logo detection.

The instructions 106 may include instructions to store the administrative metadata and descriptive metadata in a knowledge base. In various examples, the ontology or schema of the knowledge base may be implemented as a knowledge graph. A knowledge graph includes a representation of nodes and edges between the nodes. A node may correspond to the digital image. Other attribute nodes may represent fields within the administrative metadata data or metadata extracted from the digital image itself. An edge connecting nodes may represent the "has" relationship, that the digital image "has" an example EXIF data field or another descriptive metadata feature. The edge representation may include directional information to indicate digital image has an administrative metadata such as EXIF data or descriptive metadata not vice-versa. Numerous variations on the kinds of nodes and edges may be used to implement the knowledge graph. The knowledge graph may allow for searching of the ontology or schema to determine or retrieve information regarding the subject being modeled.

The instructions 106 may also include instructions to determine a digital image quality score 116. The digital image quality score may be determined manually or automatically. In one implementation, the score may be generated manually based on a user input. For example, a user may discard a digital image captured with the digital camera. In this example, the user intrinsically makes the determination that the combination of administrative metadata and descriptive metadata does not meet a threshold. The classification provided by the user's action of discarding an image, may present a set of administrative metadata and a set of descriptive metadata that may not be sufficient to produce a higher score. In another implementation, the digital image quality score may be generated based on the administrative metadata and the descriptive metadata. Additionally, manual scoring provided by a user may be used to determine intrinsically low scored combinations of administrative metadata and descriptive metadata. Absent a manual input from a user, the processor 102 may utilize a classification algorithm to identify common characteristics within the administrative and descriptive metadata corresponding to aesthetically quality digital images. The common characteristics may be weighted to based on a historical relevance to aesthetically quality digital images. The summation of the weighted common characteristics may produce a digital image quality score. In other embodiments, other algorithms for evaluating administrative and descriptive metadata may be used to derive the digital image quality score. Existing methods may be utilized as long as they are suited for receiving the administrative metadata and the descriptive metadata as input and discriminate the score based on the attributes contained in both metadata sets.

The instructions 106 may include instructions to create a recommendation based on the administrative metadata, the descriptive metadata and the digital image quality score 118. The recommendation may correspond to an improvement action based on a low digital image quality score. The recommendation may be developed by a recommendation engine. The recommendation may evaluate the digital image quality score and the incorporated subcomponents. The recommendation engine may determine if the digital image quality score does not exceed a threshold corresponding to a quality digital image. However, the recommendation engine may evaluate whether the digital image quality score was within a range of the threshold, wherein the range is close to the digital image quality score. The range may represent a value of the digital image quality score where an improvement of any one of the administrative metadata characteristics or the descriptive metadata characteristics may increase the digital image quality score over the threshold. The recommendation engine may identify the respective metadata characteristic (administrative or descriptive) and suggest to a user, how to remedy or improve that characteristic. The suggestion may be a lookup table for common photographic remedies such as applying a white balance, etc. In another implementation, the recommendation engine may interface a larger knowledge base of communal administrative metadata and communal descriptive metadata. The larger knowledge base may include many more sets of administrative and descriptive metadata from a community of users.

The processor 102 may traverse a knowledge graph based on the larger knowledge base with the administrative metadata and descriptive metadata. The processor 102 may traverse the edges and the nodes of the knowledge graph to identify characteristics in common of the larger knowledge base and those characteristics of the administrative metadata and the descriptive metadata of the digital image.

The processor 102 may identify commonalities between nodes and edges of the knowledge base corresponding to the digital image, and a set of nodes and edges of the larger knowledge base. The commonalities may correspond to common characteristics of the between the administrative and descriptive metadata of the digital image, and the same of a communal set of digital images populating the knowledge graph. The processor 102 may utilize the commonalities within the nodes and edges to identify the characteristics in common with the larger knowledge base and the knowledge base of the digital image. By examining, the edges and nodes, the processor 102 may identify characteristics in the administrative or descriptive metadata which may improve the digital image quality score. For example, the processor 102 may identify a digital image in the larger knowledge base with a very high percentage match of common characteristics. However, the digital image quality score of the image in the larger knowledge base is considerably higher. The processor 102 may identify the common characteristics that differ and suggest to the user an action to close that gap.

In one implementation, the recommendation may correspond to an aspect of the descriptive metadata. In one implementation, the descriptive metadata may correspond to detected landmarks within the digital image. The recommendation may correspond to a nearby photography subject based on the comparison of the descriptive metadata of the digital image, and communal descriptive metadata of digital images with many commonalities within the larger knowledge base.

Figure 2A:
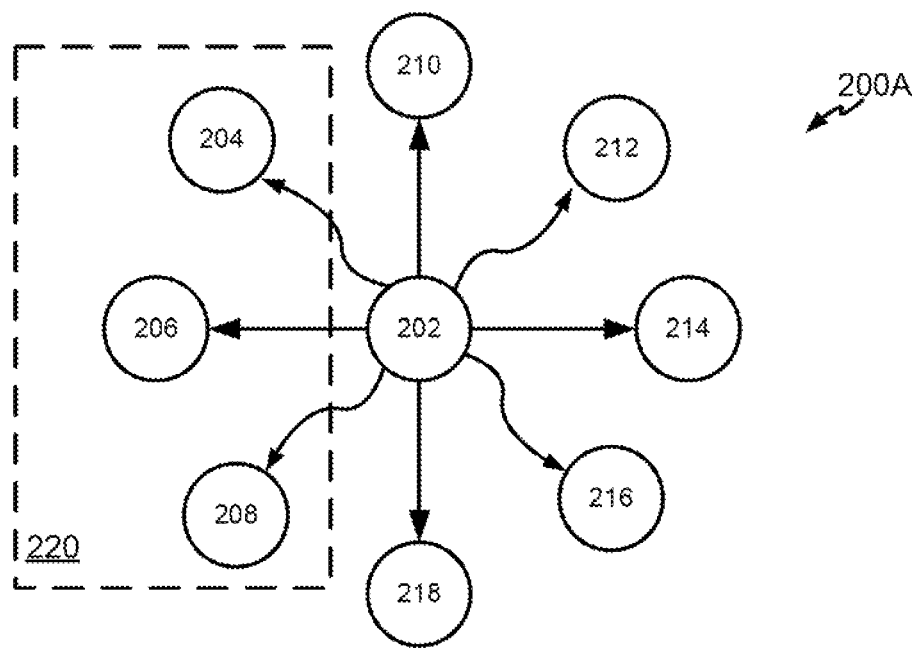
FIG. 2A is an illustration of a knowledge base schema, according to another example.

FIG. 2A is an illustration of a knowledge base schema 200A, according to another example. The knowledge base schema 200A illustrated in FIG. 2A may be a visual representation of the knowledge base described in reference to FIG. 1 and subsequent figures. Nodes and edges may be omitted for clarity, but the knowledge base schema 200A is not limited to nodes and images illustrated om FIG. 2A.

Within the knowledge base schema 200A, a photo node 202 is included. The photo node 202 may correspond to representation of all the metadata extracted out of the digital image file. The photo node 202 may include edges and nodes corresponding to the administrative and descriptive metadata. In this example knowledge base schema 200A, the descriptive metadata may correspond to one or more machine learning nodes 220 that were obtained through examination of the photo by a machine learning model to serve as a recommendation base. The machine learning nodes 220 may include characteristics extracted from the subjects of the digital image. For example, faces 204, objects 205, and brands 208 may be included within the machine learning nodes 220, and the broader descriptive metadata.

The faces 204 may be identified only as unique faces wherein the face described in the node may be identified within other photo nodes 202. The faces 204 may not identify specifically an individual but may identify a unique face within the digital image or the larger knowledge base as described within the description of FIG. 1. A special case of the faces 204 may include a different node (not illustrated) corresponding to celebrities. Celebrity faces are those that are easily identifiable due to prominence in public life. Celebrities may be included as a node off the photo node 202 within the machine learning nodes 220, but not illustrated here. Objects 206 may include identified objects within the digital file. For example, physical geographic landmarks captured during the imaging of the digital image and extracted as a descriptive metadata may be one of the objects 206. Likewise, cars, bicycles, and any other identifiable objects by machine learning algorithms may be classified as objects 206. Brands 208 and logos may be captured within the machine learning nodes 220. Brands 208 may include trademarked image marks to identify specific items within the captured digital image file.

The remaining nodes may correspond to administrative metadata. In one implementation, the administrative metadata may correspond to EXIF data of the image file. In the EXIF data implementation, nodes may include but are not limited to flash 210, shutter speed 212, Global Positioning system (GPS) data 214, brightness 216, and aperture 218.

Figure 2B:
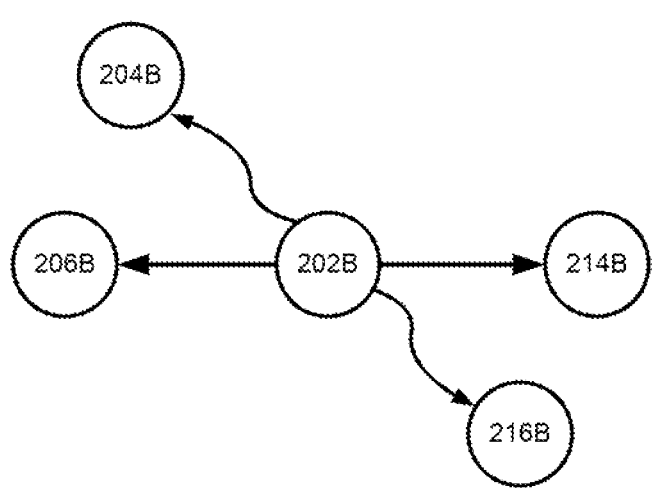
FIG. 2B is an illustration of an instantiated knowledge base, according to an example.

FIG. 2B is an illustration of an instantiated knowledge base 200B, according to an example. As illustrated in the knowledge base schema, a photo node 202B provides a root. In this illustration, the administrative data and the descriptive metadata have been extracted from the digital image, and the knowledge base has been populated. The descriptive metadata may include a face 204B and an object 206B. The administrative data may generate nodes for GPS data 214B and brightness level 216B.

Figure 3:
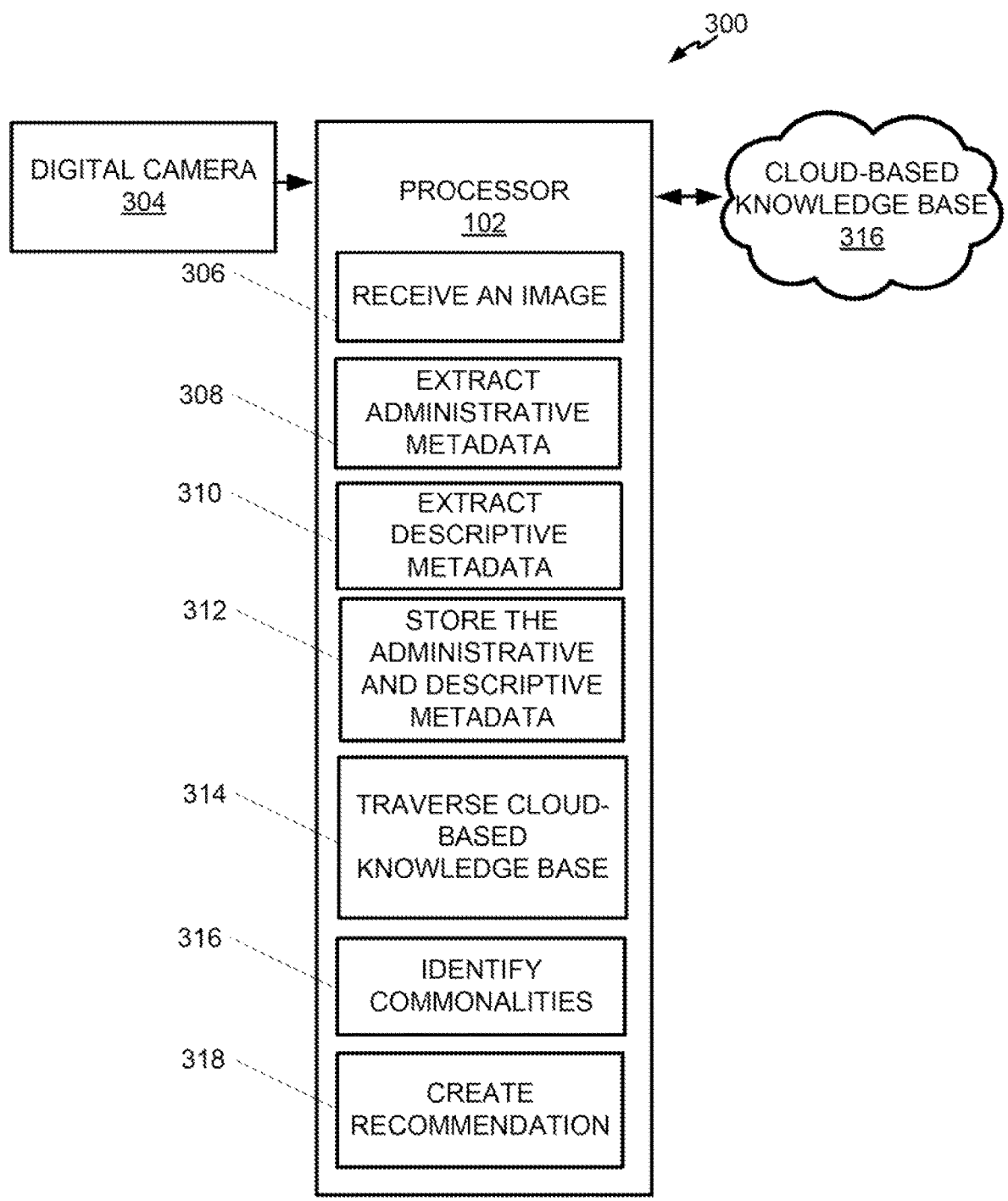
FIG. 3 is a block diagram of a system for knowledge base image recommendations according to an example.

FIG. 3 is a block diagram of a system 300 for knowledge base image recommendations according to an example. The system 300 may provide cloud-based recommendations based on a large knowledge base comprising a large group or set of digital images supporting the large knowledge base.

The system may include a digital camera 304, a processor 102, and a cloud-based knowledge base 316. In one implementation the digital camera 304 and the processor 102 may be integrated into a single physical device, such as a mobile phone handset. In another implementation, the digital camera 304 may be a standalone digital capture device, such as a digital SLR camera. The digital camera 304 may be communicatively connected to the processor 102 via a communication protocol and the associated communication hardware to facilitate the communication protocol (not shown). In one implementation a digital SLR may be connected to the processor of a mobile phone handset by a wireless data connection.

Likewise, the processor 102 may be connected to the cloud-based knowledge base 316 utilizing a communication protocol and utilizing the associated communication hardware to facilitate the communication protocol. An example may include a mobile phone handset connecting to a cloud server via a 5G mobile internet connection.

The processor 102 may receive a digital image from the digital camera 306. In an internal digital camera 304 implementation, the image may be transferred to the processor 102 over a bus. In an external digital camera 304 implementation, the image may be transferred to the processor 102 over a wired or wireless communication interface, the associated communication hardware, and a bus connecting the associated communication hardware and the processor 102.

The processor 102 may extract administrative metadata 308. As described previously, the administrative metadata may include EXIF data.

The processor 102 may extract descriptive metadata based on machine learning algorithm 310. As described previously, the descriptive metadata may include data determined by way of analysis of the content of the photo. For example, detecting objects and identifying the objects may be included in the descriptive metadata.

The processor 102 may store the administrative data and descriptive metadata in the cloud-based image knowledge base 312. The processor 102 may transmit the extracted items across a connective communication medium to the cloud-based knowledge base. The cloud-based knowledge base may be similar to the larger knowledge base described previously in that it contains many instantiated photo nodes 202 (see FIG. 2) corresponding to a large set of digital images uploaded to the cloud-based knowledge from many different users.

The processor 102 may traverse the cloud-based knowledge base based on the administrative metadata and descriptive metadata 314. In one implementation, the processor 102 may interface directly with the cloud-based knowledge base via an application programming interface (API). The processor 102 may utilize well-defined commands to navigate the cloud-based knowledge base and to retrieve node information. In another implementation, the processor 102 may provide instructions to the cloud-based knowledge base 316 indicating how the processor 102 would like the cloud-based knowledge base traversed. In this implementation, the processor 102 itself doesn't logically traverse the cloud-based knowledge base 316, but instead set parameters for a traversal to be performed by the underling hardware supporting the cloud-based knowledge base itself.

The processor 102 may identify commonalities between nodes and edges of the cloud-based knowledge base 316. As described previously, the processor 102 may provide commands through an API to traverse and examine the nodes and edges of the cloud-based knowledge base 316. The identifying of commonalities may be similar to that described in reference to FIG. 1. In another implementation, the processor 102 may provide parameterized instructions to the cloud-based knowledge base 316 to identify the commonalities utilizing the cloud-based knowledge base's underlying hardware.

The processor 102 may create a recommendation based on the administrative metadata, the descriptive metadata, and the digital image quality score 318. As described in reference to FIG. 1, the processor 102 may execute a recommendation engine that generates a digital image quality score, and provides recommendations based on the digital image quality score meeting a threshold, identifies characteristics within the descriptive and administrative metadata that may improve the digital image quality score, and makes recommendations on those characteristics.

In one implementation, the device, may create the recommendation prior to the user activating a final capture of an image. For example, the system 300 may extract the digital image from a preview video stream. The digital image thereby is not received as a user's deliberately captured image, but instead is a transient image in a stream of transient images. By performing the analysis on the transient image, the system 300 provides the user an insight into how to improve the final capture prior to the final capture being activated.

Figure 4:
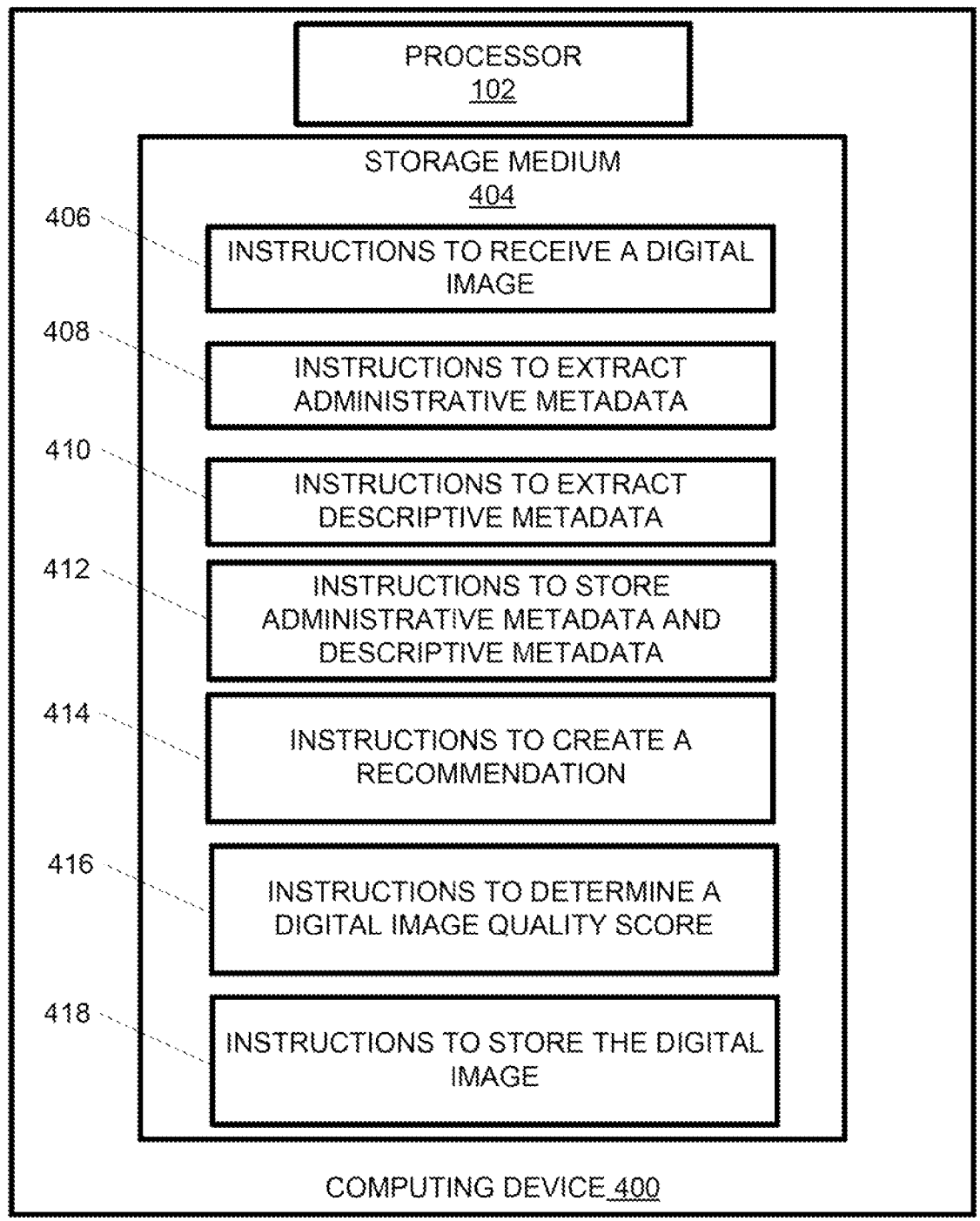
FIG. 4 is a computing device for supporting instructions for knowledge base image recommendations, according to an example.

FIG. 4 is a computing device for supporting instructions for knowledge base image recommendations, according to an example. The computing device 400 depicts a processor 102 and a storage medium 404 and, as an example of the computing device 400 performing its operations, the storage medium 404 may include instructions 406-416 that are executable by the processor 102. The processor 102 may be synonymous with the processor 102 referenced in FIG. 1. Additionally, the processor 102 may include but is not limited to central processing units (CPUs). The storage medium 404 can be said to store program instructions that, when executed by processor 102, implement the components of the computing device 400.

The executable program instructions stored in the storage medium 404 include, as an example, instructions to receive a digital image 406, instructions to extract administrative metadata 408, instructions to extract descriptive metadata based on a machine learning algorithm 410, instructions to store the administrative metadata and descriptive metadata in a knowledge base 412, instructions to create a recommendation based on the administrative metadata the descriptive metadata, and the digital image quality score 414, instructions to determine a digital image quality score 416, and instructions to responsive to a user input, store the digital image 418.

Storage medium 404 represents generally any number of memory components capable of storing instructions that can be executed by processor 102. Storage medium 404 is non-transitory in the sense that it does not encompass a transitory signal but instead is made up of at least one memory component configured to store the relevant instructions. As a result, the storage medium 404 may be a non-transitory computer-readable storage medium. Storage medium 404 may be implemented in a single device or distributed across devices. Likewise, processor 102 represents any number of processors capable of executing instructions stored by storage medium 404. Processor 102 may be integrated in a single device or distributed across devices. Further, storage medium 404 may be fully or partially integrated in the same device as processor 102, or it may be separate but accessible to that computing device 400 and the processor 102.

In one example, the program instructions 406-418 may be part of an installation package that, when installed, can be executed by processor 102 to implement the components of the computing device 400. In this case, storage medium 404 may be a portable medium such as a CD, DVD, or flash drive, or a memory maintained by a server from which the installation package can be downloaded and installed. In another example, the program instructions may be part of an application or applications already installed. Here, storage medium 404 can include integrated memory such as a hard drive, solid state drive, or the like.

It is appreciated that examples described may include various components and features. It is also appreciated that numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the scope of the disclosure. Thus, the present disclosure is not intended to be limited to the examples shown herein but is to be accorded the widest scope consistent with the principles and novel features disclosed herein.

What is claimed is:

1. A device comprising:
   a memory,
   a processor, communicatively coupled to the memory, wherein the processor executes instructions to:
   receive a digital image;
   extract administrative metadata for the digital image;
   extract descriptive metadata based on machine learning algorithm;
   store the administrative metadata and descriptive metadata in a knowledge base;
   perform a traversal of a knowledge graph based on the knowledge base, using the administrative metadata and the descriptive metadata;
   identify commonalties between nodes and edges of the knowledge graph, based on the traversal;
   determine a digital image quality score of the digital image; and
   create a recommendation based on the commonalities, the administrative metadata, the descriptive metadata, and the digital image quality score.

2. The device of claim 1, wherein the knowledge base comprises a schema corresponding to a set of fields of the administrative metadata and the descriptive metadata.

3. The device of claim 1, wherein the processor executes the instructions to further:
   interface the knowledge base with a larger knowledge base of communal administrative metadata and communal descriptive metadata,
   wherein the knowledge graph that is traversed is further based on the larger knowledge base with which the knowledge base has been interfaced.

4. The device of claim 1, wherein the recommendation comprises an improvement action to improve the digital image quality score of the digital image.

5. The device of claim 1, wherein the recommendation comprises identification of a photography subject near the device based on the descriptive metadata.

6. A system comprising:
   a digital camera;
   a cloud-based image knowledge base; and
   a processor communicatively coupled to the digital camera and the cloud-based digital image knowledge base to:
   receive a digital image from the digital camera;
   extract administrative metadata;
   extract descriptive metadata based on machine learning algorithm;
   store the administrative metadata and descriptive metadata in the cloud-based knowledge base;

perform a traversal of a cloud-based knowledge graph based on the cloud-based knowledge base, using the administrative metadata and descriptive metadata;

identify commonalities between nodes and edges of the cloud-based knowledge graph, based on the traversal; and create a recommendation based on the commonalities, the administrative metadata, the descriptive metadata, and a digital image quality score of the digital image.

7. The system of claim 6, wherein the processor is to extract the descriptive metadata by performing face detection, object and scene detection, and brand recognition on the digital image.

8. The system of claim 6, wherein the recommendation comprises an improvement action to improve the digital image quality score of the digital image.

9. The system of claim 6, wherein the recommendation comprises identification of a photography subject near the digital camera based on the descriptive metadata.

10. The system of claim 6, wherein the recommendation is created prior to a user activating a final image capture using the digital camera.

11. A non-transitory computer readable medium comprising machine readable instructions that when executed cause a processor to:

receive a digital image;

extract administrative metadata from the digital image;

extract descriptive metadata based on machine learning algorithm;

store the administrative metadata and descriptive metadata in a knowledge base;

perform a traversal of a knowledge graph based on the knowledge base, using the administrative metadata and the descriptive metadata;

identify commonalities between nodes and edges of the knowledge graph, based on the traversal;

determine a digital image quality score of the digital image;

create and provide a recommendation based on the commonalities, the administrative metadata, the descriptive metadata, and the digital image quality score; and responsive to a user input, store the digital image.

12. The medium of claim 11, wherein the recommendation is created prior to storing the digital image.

13. The medium of claim 11, wherein the descriptive metadata is extracted by comprises performing face detection, object and scene detection, and brand recognition on the digital image.

14. The medium of claim 11, wherein the recommendation comprises an improvement action to improve the digital image quality score of the digital image.

* * * * *